US006424718B1

United States Patent
Holloway

(10) Patent No.: US 6,424,718 B1
(45) Date of Patent: Jul. 23, 2002

(54) DATA COMMUNICATIONS SYSTEM USING PUBLIC KEY CRYPTOGRAPHY IN A WEB ENVIRONMENT

(75) Inventor: Christopher James Holloway, Woking (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/872,851

(22) Filed: Jun. 11, 1997

(30) Foreign Application Priority Data

Oct. 16, 1996 (GB) .............................................. 9621601

(51) Int. Cl.[7] .................................................. H04L 9/30
(52) U.S. Cl. ......................... 380/277; 380/281; 380/30; 713/171
(58) Field of Search ..................... 380/21, 49, 277–285; 713/156, 171, 201, 229

(56) References Cited

U.S. PATENT DOCUMENTS 4,182,933 A * 1/1980 Rosenblim .................... 380/21
4,484,025 A * 11/1984 Ostermann et al. ............. 380/21
4,731,840 A * 3/1988 Mnniszewski et al. ......... 380/21

FOREIGN PATENT DOCUMENTS

EP   0725512   8/1996

OTHER PUBLICATIONS

Meyer and Matyas 'Cryptography—A New Dimension in Computer Data Security', pp. 32–48, Wiley 1982.
Laih et al 'Two efficient server–aided secret computation protocols based on the addition sequence', Advances in Cryptology—Asiacrypt 91 Proceedings 1993, pp. 450–459.
Douglas McArthur 'World Wide Web and HTML', pp. 18–26 in Dr Dobbs Journal, Dec. 1994.

* cited by examiner

Primary Examiner—Gilberto Barrón, Jr.
(74) Attorney, Agent, or Firm—Jeanine S. Ray-Yarletts

(57) ABSTRACT

Described is a communications system in which messages may be processed using public key cryptography with a private key (SKu) unique to one or more users (150). The system comprises a server means (130) adapted for data communication with a client (110) via a network (100), the server means (130) comprising first data storage means in which is stored in a secure manner a private key for the or each user, the private key being encrypted with a key encrypting key. The server means further comprises second data storage means in which is stored applet code executable on the client. The server provides the applet code to the client via the network in response to connection of the client to the server via the network. The applet code comprises secure processing means operable, when executed in the client, to receive a message to be processed from the user, to retrieve the encrypted private key for the user from the server means via the network, to receive the key encrypting key from the user, to decrypt the private key using the key encrypting key, and to perform the public key processing for the message using the decrypted private key. The applet code and the associated keys are removed from the client on termination of the applet code.

4 Claims, 3 Drawing Sheets

DATA COMMUNICATIONS SYSTEM USING PUBLIC KEY CRYPTOGRAPHY IN A WEB ENVIRONMENT

TECHNICAL FIELD

The present invention relates to data communications systems and, more particularly, to the secure processing of messages therein using public key cryptography. The invention finds particular, though not exclusive, application to the generation of digital signatures.

BACKGROUND OF THE INVENTION

Public key cryptographic algorithms are widely used to authenticate the origin of or ensure the security or integrity of messages in data communications systems. Various types of such algorithms exist of which one well known variant is the RSA algorithm. A general introduction to public key cryptography and the RSA algorithm can be found in: Meyer and Matyas 'Cryptography —A New Dimension in Computer Data Security', pages 32–48, Wiley 1982. These algorithms have some distinct advantages over the more traditional symmetric key algorithms. In particular, they provide the ability for a key to be published or certified so that any independent third party can receive and verify a message without reference to a central authority.

One example of the use of public key cryptography in data communications is in the generation of digital signatures. The principle behind these techniques is the creation of a public digital value—the signature —which depends on a message to be transmitted and the signing user, so the receiving user can be sure that the sending user, and no other user, could create the signature value, and that the user created the signature value for this message and no other.

In such systems, the party signing a message has a private key for which there exists a corresponding public key. The public key is available so that anyone can use it to decrypt data which the signer encrypts using the private key, but no-one can create such encrypted data without access to the private key.

Typically, the signer produces a hash value from the message using a strong hash algorithm, such that the chance of another message resulting in the same value is extremely low. The means of calculating this value is public knowledge but there is no feasible way to determine a different message which results in the same value. The signer encrypts the value using the private key, and sends the message and the encrypted value to the recipient. The encrypted value is generally known in the art as a "digital signature".

The recipient can use the public key to decrypt the value, and can test whether the calculation on the message produces the same value. If it does, this satisfies the recipient that the message was the one signed because there is no feasible way to calculate another message which produces the same value. The recipient can also be sure that the signer did indeed sign the message because no-one can create the encrypted value without access to the private key.

However, such public key encryption schemes are computationally intensive and demand substantially higher computing resources, such as processing power and memory requirements, for encryption and decryption than symmetric key schemes.

In many applications of public key cryptography to data communications, the message must be processed under the control of a security device and presented by the user. The security device may be a home computer terminal or a portable device such as a smart card, PCMCIA card or laptop computer. Whilst methods have been proposed to enable messages to be signed with much less computational effort than they can be verified, such as in the U.S. Department of Commerce/National Institute of Standards and Technology (NIST) Digital Signature Standard published in Federal Information Processing Standard (FIPS) 186, May 19, 1994, the situation remains that, using current technology, in many cases it is not practical or cost-effective to provide such security devices with the necessary processing power or memory to perform sufficiently strong public key processing in an acceptable time.

Various methods have been proposed in the prior art to enable such a security device to perform the public key processing with the aid of a powerful server computer, without requiring the security device to reveal the secret key to the server. Examples of these techniques can be found, for example, in: Laih et al, 'Two efficient server-aided secret computation protocols based on the addition sequence', Advances in Cryptology—Asiacrypt 91 Proceedings 1993 pp450–459.

Whilst these methods go some way to alleviating the problem, they suffer from several disadvantages inherent in storing the secret key on a device in the possession of the user.

First, it is possible the device may be probed to obtain the secret key.

Secondly, if the signer's private key is compromised, a different user might use it to process messages. In this circumstance, a means is required to revoke the secret key so the unauthorised user can no longer use it. Since the security devices are not connected to the system at all times and could be reconnected to the system at any point, withdrawing or preventing use of the secret keys is, in practice, very difficult. Typically this has been achieved using various types of user blacklists. However, there are many practical difficulties associated with controlling, updating and verifying the authenticity of such lists, particularly over widespread networks.

Furthermore, since some smart card implementations which make use of public key algorithms for signing purposes cannot generate the user's public and private key pair within the smart card, there are potential security exposures when the key is initially loaded into the security device. This is because the key generation algorithm is quite complex, more so than the encryption and decryption functions. Therefore if it is required to store the secret key on the card then it may also be required to generate the secret key off the card and to enter it onto the card during an initialisation process. This initialisation process inevitably exposes the key to some degree.

European Patent Application EP 0 725 512 A2 describes a communications system in which messages are processed using public key cryptography with a private key unique to one or more users under the control of a portable security device held by the, or each, user, the system comprising: a server for performing public key processing using the private key, the server being adapted for data communication with the portable security device; characterised in that the server comprises, or has access to, data storage means in which is stored in a secure manner the private key for the, or each, user in encrypted form only, the private key being encrypted with a key encrypting key, the server comprising secure processing means to receive a message to be processed from the user, retrieve the encrypted private key for the user, decrypt the private key using the key encrypting key, perform the public key processing for the message using the decrypted private key, and delete the key encrypting key and decrypted private key after use, and in that each security device comprises means for storing or generating the key encrypting key and providing the key encrypting key to the server and means for specifying a message to be processed, the system being arranged so that communication of at least the key encrypting key to the server is secure and so that the server can only use the key encrypting key to process the message specified by the user.

In the communication system described in EP 0 725 512, the public key algorithm is performed by a secure server. However, the server has access only to an encrypted form of the private key. A portable security device controls the public key processing by providing the server with a key to enable the server to decrypt the private key, use it, and delete the private key after use.

The present invention is directed to the problem of providing a secure method of enabling messages to be processed using public key processing on behalf of an authorised user in such a manner that it can be shown that only the authorised user could have authorised the processing of a particular message, without requiring the any cryptographic algorithms or keys to be retained by the authorised user.

SUMMARY OF THE INVENTION

To solve this problem, in accordance with the present invention there is now provided a communications system for processing messages using public key cryptography with a private key unique to one or more users, the system comprising: server means adapted for data communication with a client via a network, the server means comprising first data storage means for storing in a secure manner a private key for the or each user, the private key being encrypted with a key encrypting key; characterised in that the server means further comprises second data storage means in which is stored applet code executable on the client, the server providing the applet code to the client via the network in response to connection of the client to the server via the network; the applet code comprising secure processing means operable, when executed in the client, to receive a message to be processed from the user, to retrieve the encrypted private key for the user from the server means via the network, to receive the key encrypting key from the or each user, to decrypt the private key using the key encrypting key, and to perform the cryptographic key processing for the message using the decrypted private key; the applet code and the associated keys being removed from the client on termination of the applet code.

Preferably, the secure processing means is operable, when executed in the client during initial registration of a registering user, to generate the private key and an associated public key, to receive a key encrypting key from the registering user, to encrypt the private key using the key encrypting key received from the registering user, and to send the encrypted private key and public key from the client to the server means for storage in the first data storage means.

In preferred embodiments of the present invention, the server means comprises a key server for storing the encrypted private key, a web server connected to the network, and a fire-wall connecting the web server to the key server, the key server supplying the private key to the client via the web server.

Viewing the present invention from another aspect, there is now provided a method for processing messages using public key cryptography with a private key unique to one or more users, the method comprising: storing, in a server means adapted for data communication with a client via a network, in which is stored in a secure manner a private key for the or each user, the private key being encrypted with a key encrypting key; storing in the server means applet code executable on the client; transmitting the applet code from the server to the client via the network in response to connection of the client to the server via the network; supplying secure processing means to the client via the applet code; receiving by the client via the secure processing means, a message to be processed from the user; retrieving by the client via the secure processing means, the encrypted private key for the user from the server means via the network; receiving by the client via the secure processing means, the key encrypting key from the user; decrypting in the client via the secure processing means, the private key using the key encrypting key; performing in the client via the secure processing means the cryptographic key processing for the message using the decrypted private key; and, removing from the client the applet code and the associated keys and algorithms on termination of the applet code.

The method preferably comprises: generating, in the client via the secure processing means during initial registration of a registering user, the private key and an associated public key; receiving a key encrypting key from the registering user; encrypting, in the client via the secure processing means during initial registration of a registering user, the private key using the key encrypting key received from the registering user; and sending the encrypted private key and public key from the client to the server means for storage in the first data storage means.

Viewing the present invention from yet another aspect, there is now provided a server computer system for a communications system in which messages are processed using public key cryptography with a private key unique to one or more users, the system comprising: communication means for communicating data with a client via a network; first data storage means for storing in a secure manner a private key for the or each user, the private key being encrypted with a key encrypting key; characterised in that the server system further comprises second data storage means in which is stored applet code executable on the client, the server providing the applet code to the client via the network in response to connection of the server to the client via the network; the applet code comprising secure processing means operable, when executed in the client, to receive a message to be processed from the user, to retrieve the encrypted private key for the user from the server means via the network, to receive the key encrypting key from the user, to decrypt the private key using the key encrypting key, and to perform the cryptographic key processing for the message using the decrypted private key; the applet code and the associated keys and algorithms being removed from the client on termination of the applet code.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENT

Figure 1:
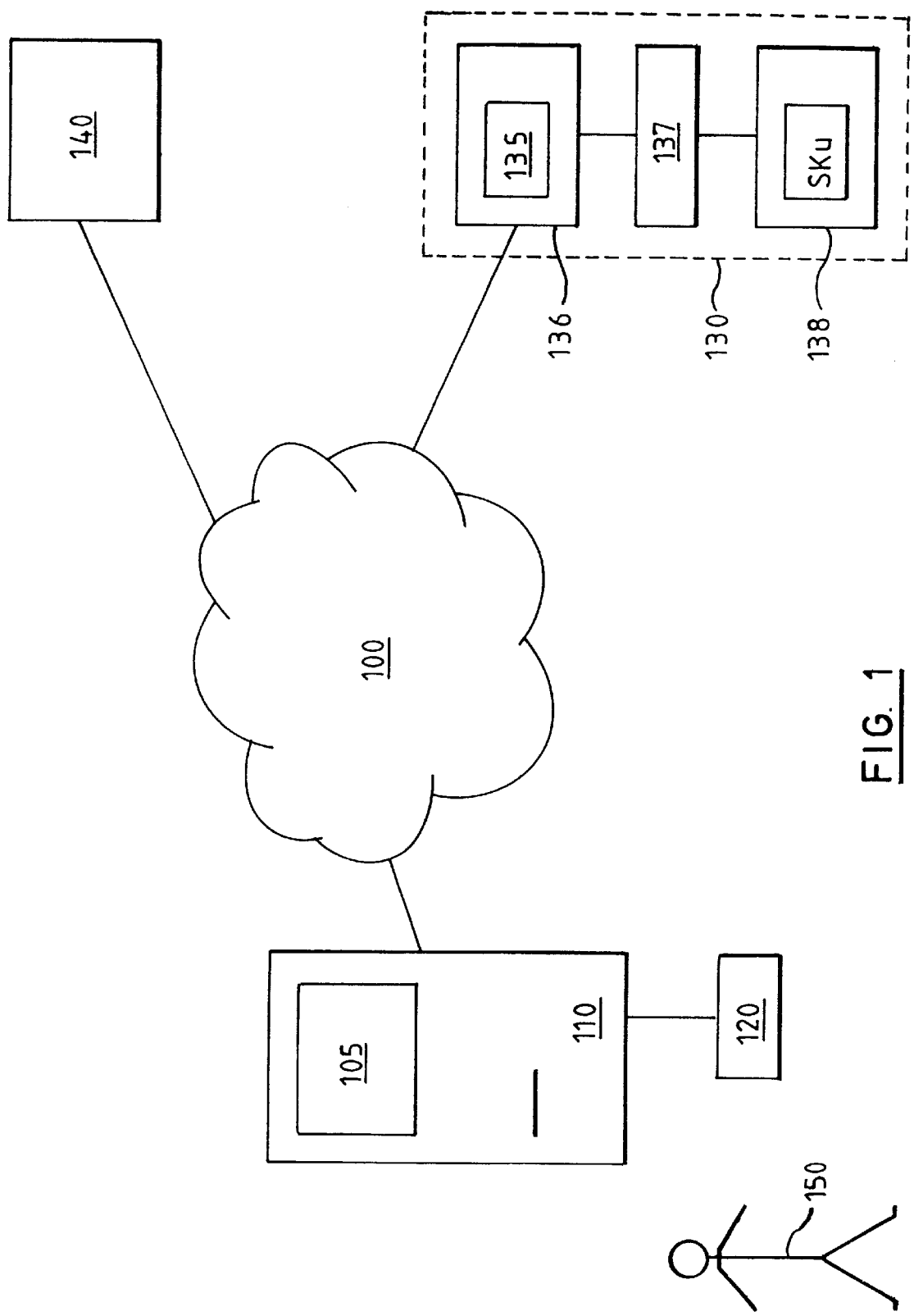
FIG. 1 is a block diagram of an example of a communications system.

The preferred embodiments of the present invention to be described shortly are arranged to operate via the Internet. More specifically, the preferred embodiments to be described shortly are arranged to operate via the Worldwide Web (WWW), which is one of the facilities provided via the Internet. The WWW comprises many pages or files of information, distributed across many different servers. Each page is identified by a Universal Resource Locator (URL). Each URL denotes both a server machine, and a particular file or page on that machine. There may be many pages or URLs resident on a single server.

To utilise the WWW, a user runs a computer program called a Web browser on a client computer system such as a personal computer. Examples of widely available Web browsers include the "WebExplorer" Web browser provided by International Business Machines Corporation in the OS/2 Operating System software, or the "Navigator" Web browser available from Netscape Communications Corporation. The user interacts with the Web browser to select a particular URL. The interaction causes the browser to send a request for the page or file identified in selected URL to the server identified in the selected URL. Typically, the server responds to the request by retrieving the requested page, and transmitting the data for that page back to the requesting client. The client-server interaction is usually performed in accordance with a protocol called the hypertext transfer protocol ("http"). The page received by the client is then displayed to the user on a display screen of the client. The client may also cause the server to launch an application, for example to search for WWW pages relating to particular topics.

WWW pages are typically formatted in accordance with a computer programming language known as Hypertext Mark-up Language ("HTML"). Thus a typical WWW page includes text together with embedded formatting commands, referred to as tags, that can be employed to control for example font style, font size, lay-out etc. The Web browser parses the HTML script in order to display the text in accordance with the specified format. In addition, an HTML page can also contain a reference, in terms of another URL, to a portion of multimedia data such as an image, video segment, or audio file. The Web Browser responds to such a reference by retrieving and displaying or playing the multimedia data. Alternatively, the multimedia data may reside on its own WWW page, without surrounding HTML text.

A WWW page, in addition to HTML text, graphics, multimedia data and URLS, can also contain computer program code generally known as an applet. When a web browser views a WWW page in which an applet is embedded, the applet is downloaded from the server on which the WWW page is resident to the local system on which the web browser is resident. The applet is then executed by and within the web browser. Applets are in general written in an object oriented programming language such the Java programming language developed by Sun MicroSystems, California, USA (Java is a trade mark of Sun MicroSystems, California, USA).

Most WWW pages also contain one or more references to other WWW pages, which need not reside on the same server as the original page. Such references may be activated by the user selecting particular locations on the screen, typically by clicking a mouse control button. These references or locations are known as hyperlinks, and are typically flagged by the Web browser in a particular manner. For example, any text associated with a hyperlink may be displayed in a different colour. If a user selects the hyperlinked text, then the referenced page is retrieved and replaces the currently displayed page.

Further information about html and the WWW can be found in "World Wide Web and HTML" by Douglas McArthur, p18–26 in Dr Dobbs Journal, December 1994, and in "The HTML SourceBook" by Ian Graham, John Wiley, New York, 1995. Further information on the Java programming language and applets can be found in "Teach Yourself Java in 21 Days" by Laura Lemay and Charles Perkins, Sams Net, Indianapolis, 1996.

Referring to FIG. 1, there is shown a communications system which comprises WWW 100. Coupled to WWW 100 is client computer system 110. The coupling between WWW 100 and client computer system 110 may be implemented via a modem link, local area network (LAN), wide area network (WAN) or any combination thereof. Client computer system 110 comprises a web browser 105 and may additionally incorporate a smart card reader for operating in conjunction with smart card 120. Also coupled to WWW 100, again possibly although not necessarily via intermediate networks, are server computer system 130. Server computer system 130 comprises a web server computer 136 coupled to a key server computer 138 via a "fire-wall" 137. Stored on web server 136 is a WWW page 135 accessible by browser 105 on client 110. As will be explained shortly, WWW page 135 facilitates messaging between user 150 and a recipient which might, for example be a bank, retail outlet or similar service. Fire-wall 137 screens key server 138 from WWW 100. Also connected to WWW 100 is another possible destination of a message from user 150, shown for the sake of example as mainframe computer 140. Client 110 could, for example, be a personal computer home terminal. Smart card 120 is in the possession of user 150. The arrangement is such that user 150 can sign a message generated by client 110 using a digital signature. The message may for example, in the case where WWW page 135 belongs to the user's bank, include a debit instruction for the user's account.

It will be understood from what follows that, whilst in these embodiments server 130 is assumed, for clarity, to be a separate computer system, the function of server 130 could equally be performed by a process running in mainframe computer 140. Furthermore, whilst in the embodiments of the present invention described herein, server computer system 130 comprises multiple server computers, it is envisaged that in other embodiments of the present invention, server computer system 130 may comprise a single computer.

What follows now, by way of background, is a brief description of public/private key message encryption, in which the notation $E_{KEY}$ (A) will be used to indicate the quantity A encrypted using a key KEY.

Figure 2:
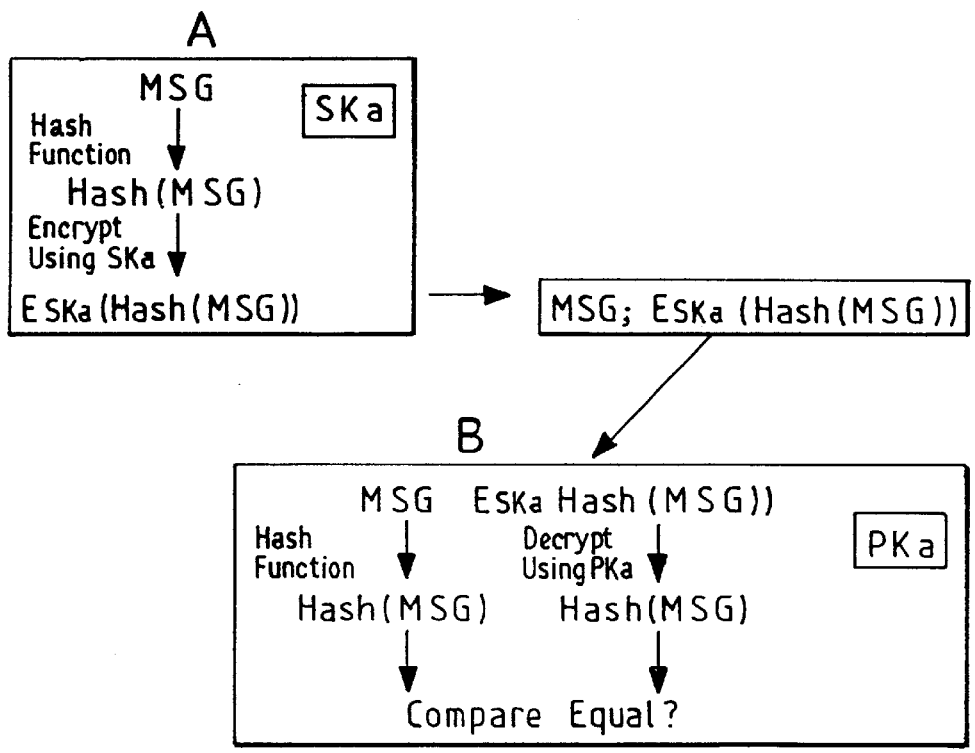
FIG. 2 illustrates the generation of a digital signature.

FIG. 2 illustrates a simple example of the principles behind the creation and use of digital signatures using public key cryptography. It will be understood that this type of digital signature is only one among many techniques for the generation of digital signatures using public key cryptography any of which may equally be employed in other embodiments of the invention.

FIG. 2 shows two users who wish to communicate with each other and to be sure of the identity of the other. Each user has a public and private key pair PK and SK. Each user shares their public key with each other user. Normally, each user would keep secret their respective private key, but the public keys would be available for whoever wished to communicate with them.

Suppose user A wishes to send a message MSG to user B over a data communications network. A digital signature is generated from the message by first generating a hash value of the message using a strong hashing function, of which there are many known types. An example of a strong hash algorithm suitable for use in calculating digital signatures is described in U.S. Pat. No. 4,908,861. The particular hashing function involved is assumed to be known to B. This hash value is then encrypted using the secret key of A to generate a digital signature $E_{SK_a}$ (Hash(MSG)). The message is then transmitted to user B along with the digital signature. User B can verify the authenticity of the message by decrypting the digital signature using the public key PKa and comparing the value obtained with a hash value obtained from the message. Although, embodiments of the present invention are described herein with reference to a digital signature in the form $E_{SK_a}$ (Hash(MSG)), it will be appreciated that the present invention is equally applicable to system in which other forms of digital signatures are employed.

In practice, the integrity of the public keys PKa would be certified by a third party whose role would be to certify keys. This would serve to satisfy B that PKa was indeed the public key associated with A and not with anybody else. Such certification and distribution of public keys is well known in the art and will not be further described herein. A discussion of these certificates can be found in CCITT Recommendation X.509 Directory Services (1988).

Figure 3:
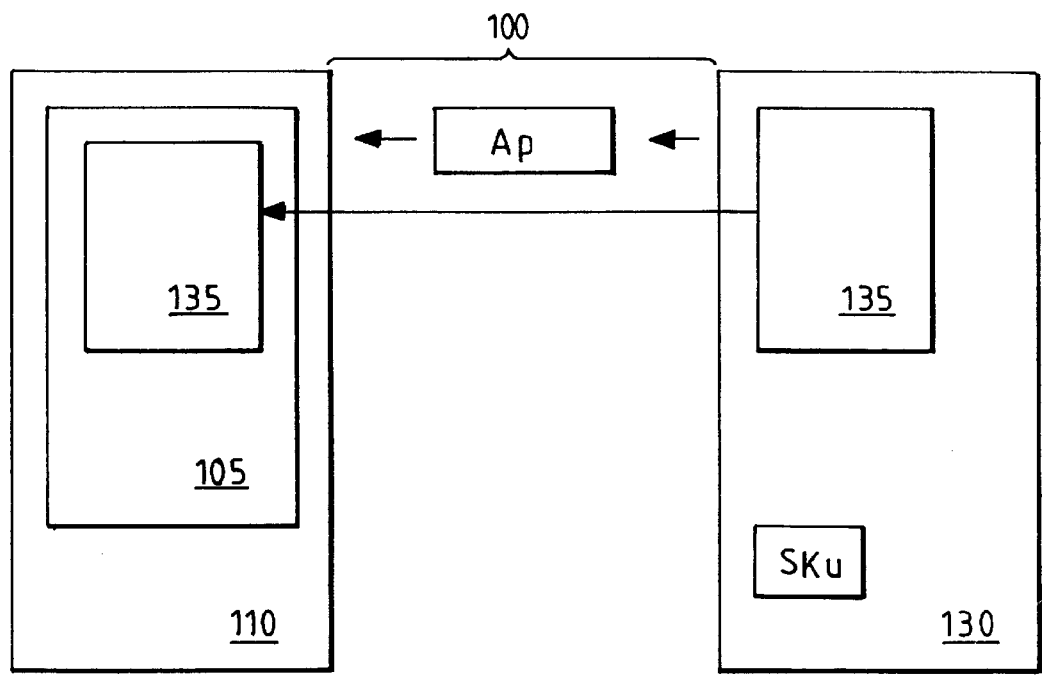
FIG. 3 illustrates transfer of an applet in the communication system of FIG. 1.
Figure 4:
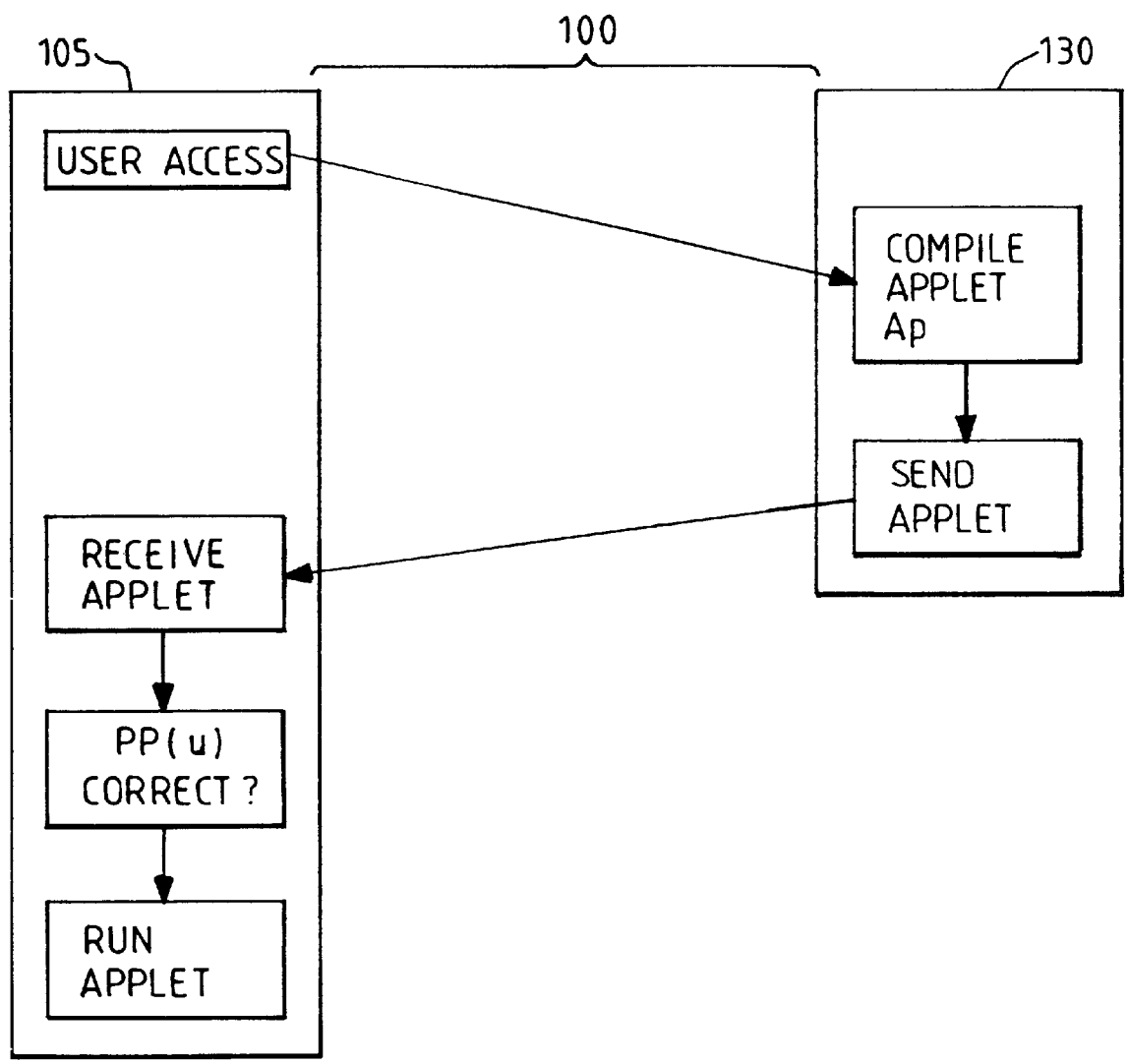
FIG. 4 illustrates generation of the applet in the communication system of FIG. 1.

Referring back to FIG. 3, in a preferred embodiment of the present invention, the private key SKu belonging to a user is stored in a storage portion of key server 138 or within a data storage means to which server 138 has access. Private key SKu is delivered from server system 130 to user 150 within an applet Ap via web server 136 and WWW 100. Applet Ap may for example by written in the aforementioned Java programming language. It will be appreciated from the following description that this arrangement reduces risk of theft or misuse because keys and cryptographic algorithms are only down-loaded to client 110 when requested by the owning user. Additionally, WWW security such as SSL (Secure Sockets Layer) and SHTTP (Secure HyperText Transfer Protocol) protect data only as far as server 130. As will be made apparent shortly, the applet solution described herein enables security to run end to end between business applications.

In operation, when a user claiming to be authorised accesses WWW page 135 on web server 136 via browser 105 on client 110, server system 130 compiles applet Ap. Applet Ap includes the claimed users encrypted private key $E_{PP_u}$ (SKu) stored on key server 138, and all of the associated cryptographic algorithms. Server 130 sends applet Ap to browser 105 via WWW 100. At browser 105, private key SKu may be used by the applet only if the claimed user knows, and is therefore able to enter into client 110, the owning users pass phrase PPu. Knowledge of pass-phrase PPu establishes the identity of the owning user by enabling use of private key SKu to "sign" messages. When applet Ap or browser 105 terminate, the algorithms and keys are lost from the memory of client 110.

In preferred embodiments of the present invention, a transaction is secured by applet Ap supporting the steps of: User Registration; User sign in; User authentication; Message security; User re-registration; and, Revocation. Conventional cryptographic techniques such as SSL may be employed to establish the authenticity of server 130.

Applet Ap further includes a data integrity public key certificate PUB(i,s) and a data confidentiality public key PUB(c,s) each belonging to the server, a random seed R(s), a time stamp T(s), and a nonce N(s). The last three values could all be the same. At browser 105, applet Ap non-deterministically generates a random symmetric algorithm key KS(m,a) as a function of the seed R(s) and return this to server system 130 encrypted using PUB(c,s). Algorithm key KS(m,a) can then be employed to protect message data sent back to server system 130 from client 110 using both message authentication codes (MACs) and encryption.

There are three stages to the step of user registration: Apply to Register; Consent to Registration; and Update Registration.

In the Apply to Register stage, the user applies to be registered. The keys are all created, but disabled cryptographically until user 150 consents to the use of the keys. Applet Ap requests the user to enter registration data such as name, account number, address, etc, as may be required by server system 130. Applet Ap also requests the user to enter a pass phrase PPu which will be used to encrypt private key SKu of user 150 once it has been generated. Pass Phase PPu may for example be stored on smart card 120. Applet Ap also generates a new private/public key pair SKu/PKu and builds a certificate request message for returning to server system 130. The certificate request message includes public key PKu and the encrypted private key $E_{PP_u}$ (SKu), together with the time stamp T(s) and the user registration details. The MAC of the message is calculated by inclusion of the Nonce N(s). This prevents two registrations against the same original request. The message is encrypted using the algorithm key KS(m,a) which is itself appended to the encrypted message and encrypted using the data confidentiality public key PUB(c,s) prior to transmission to server system 130. The message is received and validated at server system 130. A consent phrase CPu is generated at server system 130 which is printed on secure stationery and dispatched to user 150, by post for example. Consent phrase CPu is also employed as an encryption key to further encrypt private key SKu belonging to user 150. Encrypted private key $E_{CP_u}$ ($E_{PP_u}$ (SKu)) is stored in memory at key server 138 of server system 130 or, in alternative embodiments otherwise, in a separate data store to which server system 130 has secure access. In the memory, private key SKu is indexed to the identity of the claiming user awaiting consent. Pass phrase PPu and consent phrase CPu need not necessarily be used as keys. In some embodiments of the present invention, the phrases could be processed by a message digest or hashing algorithm such as SHA-1 to produce an encryption key. Pass phrase PPu and its hash are unknown to server system 130, and prevent server system 130 from using private key SKu.

The Consent to Registration stage seeks to prevent a fraudulent application from becoming effective. Separating registration into two stages permits verification of the claimed identity of user 150, and presents the opportunity for user 150 to be requested to sign and return a documentary consent form (in response to receiving the consent phrase, for example). It also permits a public key certificate to be created for placement on a public directory off-line. When user 150 selects the Consent to Register stage (having received the consent phrase through the post, for example) applet Ap requests both the registration data and consent phrase CPu. Applet Ap encrypts and authenticates the entered registration data and consent phrase CPu. Once encrypted and authenticated, the registration data and consent phrase CPu are sent by applet Ap to server 130. Server system 130 unlocks encrypted private key $E_{CP_u}$ ($E_{PP_u}$ (SKu)) using consent phrase CPu. To verify correct deciphering of private key $E_{PPu}$ (SKu)), a hash value of the encrypted private key record is retained at server system 130. The retained hash value is compared by server 130 system with a hash of the encrypted private key record deciphered via consent phrase CPu. The comparison verifies the correctness of the consent phrase CPu. Private key SKu, which at this stage is still enciphered via pass phrase PPu, can be sent to applet Ap in browser 105 in preparation for sign-in.

In the User Sign In step, user 150 is presented with option of selecting registration services or transaction services. Registration services were described earlier. It will be appreciated that user 150 will normally request transaction services rather than registration services. When wishing to request a transaction such as debit instruction, user 150 initially enters his or her identity to client 110. The identity is sent by applet Ap to server system 130 in enciphered form as hereinbefore described with respect to registration. Server 130 returns the enciphered private key record as hereinbefore described again with respect to registration stage (although now no consent in required). The private key record is now held by applet Ap in client 110 but still enciphered under pass PPu phrase of user 150. Applet Ap requests user 150 to enter pass-phrase PPu to allow the applet Ap to decipher the private key record in preparation for use.

The private key record contains a hash value of the private per se along with the registration data of the user to permit verification of pass phrase PPu in the User Authentication step. Upon decipherment of the private key record by applet Ap, private key PKu along with the recorded registration data is re-hashed by applet Ap. The hash value obtained by the re-hash is compared by applet Ap with the hash value from the record. If and only if the hash value from the record matches the hash value from the re-hash is the private key SKu deemed by applet Ap to be correct, and user 150 thus deemed by applet Ap to be authentic.

It will now be appreciated that user authentication occurs in preferred embodiments of the present invention without any user passwords or PIN numbers transferring over WWW 100 except during the consent process when consent phrase is transmitted in enciphered form. Private key SKu is made available to applet Ap in browser 105, but only if the user sign in details and pass phrase PPu are determined by applet Ap to be correct.

Turning now to Message Security, at the authentication stage, applet Ap and server system 130 share a symmetric encryption key KS(m,a). Furthermore, applet Ap holds the public key certificate PUB(i,s) of server 130 and server system 130 holds the public key certificate PUB(i,a) of applet Ap. Applet Ap also holds the private key SKu of user 150. Messages can therefore be signed by the sender and verified by the recipient, and may also be enciphered via the symmetric key.

In some embodiments of the present invention, the services available via WWW page 135 may be provided by a host application resident on a separate system to server system 130. In such embodiments, the host application may have its own private and public key pairs for message confidentiality and integrity. The public key certificates of such keys are employed to protect application messages to the host application rather than those to server system 130. However, the messages relating to registration remain the domain of server system 130.

In some embodiments of the present invention, the host public key certificates PUB(c,h) and PUB(i,h) may also be served to applet Ap by server 130. In such embodiments, applet Ap generates a different end to end confidentiality key KS(m,a) enciphered under host public key certificate PUB (c,h) to provide end to end confidentiality to the host application. This enables server system 130 to be operated by a different organisation to the provider of the host application. The keys and applets are still served by server system 130, but application transactions are routed through the host application and secured on an end to end basis.

The Re-registration step permits a new enciphered private key record to be lodged with server system 130 against an identity recorded in relation to a user who is already registered. The private key record may have changed because, for example, the pass phrase and therefore the encryption key has changed, or because a new signature private and public key pair have been generated. Both cases are treated as if both the pass phrase and the private/public key pair have changed. The message sent by applet Ap to server system 130 includes the enciphered new private key record, the "new" public key value and a signature using the current private key. At server system 130, the public and private key records are replaced. No consent processing is required because the request was signed under an already valid signature key. If appropriate, a new public key certificate is requested and issued. The old public key certificates are retained at server system 130 for archive purposes.

It will be appreciated that, as server 130 holds the private key, albeit enciphered, server system 130 can deactivate the key by simply erasing it. It is then no longer available for signing.

What is claimed is:

1. A communications system for processing messages using public key cryptography with a private key (SKu) unique to one or more users (150), the system comprising: server means (130) adapted for data communication with a client (110) via a network (100), the server means (130) comprising first data storage means for storing in a secure manner a private key for the or each user, the private key being encrypted with a key encrypting key;

characterised in that the server means further comprises second data storage means in which is stored applet code executable on the client, the server providing the applet code to the client via the network in response to connection of the client to the server via the network;

the applet code comprising secure processing means operable, when executed in the client during initial registration of a registering user, to generate the private key and an associated public key, to receive a key encrypting key from the registering user, to encrypt the private key using the key encrypting key received from the registering user, and to send the encrypted private key and public key from the client to the server means 130 for storage in the first data storage means;

the secure processing means being further operable, when executed in the client, to receive a message to be processed from the user, to retrieve the encrypted private key for the user from the server means via the network, to receive the key encrypting key from the or each user, to decrypt the private key using the key encrypting key, and to perform the cryptographic key processing for the message using the decrypted private key;

the applet code and the associated keys being removed from the client on termination of the applet code.

2. A communication system as claimed in claim 1, wherein the server means comprises a key server for storing the encrypted private key, a web server connected to the network, and a fire-wall connecting the web server to the key server, the key server supplying the encrypted private key to the client via the web server.

3. A method for processing messages using public key cryptography with a private key (SKu) unique to one or more users (150), the method comprising:

storing, in a server means (130) adapted for data communication with a client (110) via a network (100), in which is stored in a secure manner a private key for the or each user, the private key being encrypted with a key encrypting key;

storing in the server means applet code executable on the client;

transmitting the applet code from the server to the client via the network in response to connection of the client to the server via the network;

supplying secure processing means to the client via the applet code;

generating, in the client via the secure processing means during initial registration of a registering user, the private key and an associated public key;

receiving a key encrypting key from the registering user;

encrypting, in the client via the secure processing means during initial registration of a registering user, the private key using the key encrypting key received from the registering user;

sending the encrypted private key and public key from the client to the server means for storage in the first data storage means;

receiving by the client via the secure processing means, a message to be processed from the user;

retrieving by the client via the secure processing means, the encrypted private key for the user from the server means via the network;

receiving by the client via the secure processing means, the key encrypting key from the user;

decrypting in the client via the secure processing means, the private key using the key encrypting key;

performing in the client via the secure processing means the cryptographic key processing for the message using the decrypted private key; and, removing from the client the applet code and the associated keys and algorithms on termination of the applet code.

4. A server system as claimed in claim 1, comprising a key server for storing the encrypted private key, a web server connected to the network, and a fire-wall connecting the web server to the key server, the key server supplying the private key to the client via the web server.

\* \* \* \* \*